United States Patent
Stoussavljewitsch et al.

(10) Patent No.: US 11,876,906 B2
(45) Date of Patent: Jan. 16, 2024

(54) METHOD AND SYSTEM FOR DISTRIBUTED ASSIGNMENT OF YIELDS OF A FACILITY TO A PLURALITY OF PARTICIPATING PERSONS

(71) Applicant: YOUKI GmbH, Amberg (DE)

(72) Inventors: Martin Stoussavljewitsch, Poppenricht (DE); Michael Stoussavljewitsch, Poppenricht (DE)

(73) Assignee: YOUKI GMBH, Amberg (DE)

( * ) Notice: Subject to any disclaimer, the term of this patent is extended or adjusted under 35 U.S.C. 154(b) by 12 days.

(21) Appl. No.: 17/765,791

(22) PCT Filed: Sep. 21, 2020

(86) PCT No.: PCT/EP2020/076242
§ 371 (c)(1),
(2) Date: Mar. 31, 2022

(87) PCT Pub. No.: WO2021/063717
PCT Pub. Date: Apr. 8, 2021

(65) Prior Publication Data
US 2022/0337416 A1 Oct. 20, 2022

(30) Foreign Application Priority Data
Oct. 2, 2019 (EP) .................... 19200989

(51) Int. Cl.
*H04L 9/32* (2006.01)
*H04L 9/00* (2022.01)
*G06Q 50/06* (2012.01)

(52) U.S. Cl.
CPC .......... *H04L 9/3213* (2013.01); *H04L 9/50* (2022.05); *G06Q 50/06* (2013.01)

(58) Field of Classification Search
None
See application file for complete search history.

(56) References Cited

U.S. PATENT DOCUMENTS

| 10,984,474 | B1* | 4/2021 | Seymour | G06Q 20/02 |
| 2011/0296169 | A1 | 12/2011 | Palmer | |
| 2016/0284033 | A1 | 9/2016 | Winand et al. | |
| 2019/0086235 | A1* | 3/2019 | Cui | H04W 4/021 |

(Continued)

FOREIGN PATENT DOCUMENTS

| EP | 3 193 299 A1 | 7/2017 |
| EP | 3 460 942 A1 | 3/2019 |

(Continued)

OTHER PUBLICATIONS

International Search Report and Written Opinion dated Nov. 25, 2020, issued in corresponding International Application No. PCT/EP2020/076242, filed Sep. 21, 2020, 5 pages.

(Continued)

*Primary Examiner* — Brandon Hoffman
(74) *Attorney, Agent, or Firm* — CHRISTENSEN O'CONNOR JOHNSON KINDNESS PLLC

(57) ABSTRACT

A method for distributed assignment of yields of a facility to participating persons on the basis of a smart meter gateway network comprising smart meter gateways comprises storing information with regard to participation of a person in the facility, in a chain of data sets cryptographically linked to one another in the smart meter gateway network; storing a smart contract in a chain of data sets, the smart contract being uniquely allocated to the facility and containing facility parameters necessary to calculate yields of the facility; receiving energy information produced by the facility by at least one smart meter gateway; storing the energy information or information derived therefrom in a chain of data sets; calculating yield tokens on the basis of the energy information and the smart contract; and assigning a part of the yield tokens to a participating person on the basis of the participation information.

15 Claims, 3 Drawing Sheets

(56) References Cited

U.S. PATENT DOCUMENTS

2019/0287175 A1 9/2019 Hill et al.
2022/0078014 A1 3/2022 Stoussavljewitsch et al.

FOREIGN PATENT DOCUMENTS

WO 2019/094828 A1 5/2019
WO 2020/064346 A1 4/2020

OTHER PUBLICATIONS

M. Swan, "Blockchain: Blueprint for a New Economy", O'Reilly, ISBN: 978-1-4919-2049-7, XP055279098, Feb. 8, 2015 (Feb. 8, 2015), 150 pages.

Office Action dated Nov. 20, 2020, in corresponding European Application No. 19200989.2, filed Oct. 2, 2019, 14 pages.

European Search Report dated Mar. 19, 2020, issued in corresponding European Application No. 19200989.2, filed Oct. 2, 2019, 17 pages.

V. Buterin, "On Public and Private Blockchains," retrieved from the Internet: https://blog.ethereum.org/2015/08/07/on-public-and-private-blockchains [retrieved on Dec. 19, 2018], Aug. 6, 2015, 6 pages.

C. Torr, "Using Established, Proven Standards to Build a Secure Smart Meter Infrastructure," retrieved from the Internet: https://www.multos.com/uploads/Using_Established_Proven_Standards_to_Build_a_Secure_Smart_Meter_Infrastructure.pdf [retrieved on Feb. 22, 2019], Feb. 2, 2017, 12 pages.

Extended European Search Report dated Mar. 7, 2019, issued in European Application No. EP18196164.0, filed Sep. 24, 2018, 13 pages.

Office Action dated May 17, 2021, in European Application No. EP18196164.0, filed Sep. 24, 2018, 17 pages.

"Requirements for the interoperability of the Communication unit of an intelligent measuring system", Technical Guideline BSI TR-03109-1, Federal Office for Security in Information Technology, Bonn, Germany, Mar. 18, 2013 (German version), pp. 1-146.

Office Action dated Jul. 20, 2023, in corresponding Chinese Application No. 202080077760.6, filed Sep. 21, 2020, 4 pages.

\* cited by examiner

METHOD AND SYSTEM FOR DISTRIBUTED ASSIGNMENT OF YIELDS OF A FACILITY TO A PLURALITY OF PARTICIPATING PERSONS

FIELD

The invention relates to a method and a system for the distributed assignment of yields of an energy production facility to a plurality of participating persons.

BACKGROUND

The number of power generation facilities, in particular photovoltaic systems, wind turbines, etc., has greatly increased in the recent past. Subsidies and yields of these facilities offer rewarding investment opportunities for investors.

The disadvantage here is that a power generation facility usually involves high investment costs, which often cannot be borne by a small investor alone. In principle, it is possible to participate in such a facility via intermediaries. However, this indirect form of participation is relatively costly, as the intermediaries offer fee-based services as a result of which a considerable share of the generated yields is lost. In addition, this indirect participation is non-transparent for the investors.

SUMMARY

On this basis, an object of the present disclosure is to provide a method as well as a system for the assignment of yields of an in particular power generation facility to a plurality of participating persons, which renders possible a direct participation of investors at low costs and high transparency.

A method and system for assigning yields of a power generation facility to a plurality of participating persons are disclosed herein.

According to a first aspect, the present disclosure relates to a method for the distributed assignment of yields of a technical facility, in particular an energy production facility, to a plurality of participating persons on the basis of a network comprising a plurality of smart meter gateways. The method includes the following steps:

First, participation information is stored in a chain of data sets cryptographically linked to one another in the smart meter gateway network. The chain of data sets cryptographically linked to one another is in particular a blockchain. The participation information contains information with regard to the participation of a person in the facility, i.e. indicates who is participating in the facility and in what amount at a certain point in time.

In addition, a smart contract is stored or hosted in a chain of data sets cryptographically linked to one another in the smart meter gateway network. For example, the smart contract is a digital contract. It is uniquely assigned to the facility and contains preferably all the facility parameters necessary to calculate yields of the facility. The smart contract is preferably inscribed once in the chain of data sets cryptographically linked to one another and can subsequently no longer be changed, at least with regard to the parameters for identifying the facility and the number of participation tokens to be issued.

In a further step, energy information is received by at least one smart meter gateway, the energy information indicating which energy values or energy quantities have been produced by the facility. This receiving can occur at defined or definable time intervals, for example every 15, 10 or 5 minutes up to every few seconds. It is understood that any intermediate values shall also be considered to be disclosed as well. In this context, the smart meter gateway is preferably directly allocated to the measuring sensor, in particular the power meter, through which the energy values or energy quantities produced by the facility are measured. The smart meter gateway that receives the energy information is a component of the smart meter gateway network.

If necessary, further information can be derived from the received energy information, for example information about the amount of $CO_2$ saved in the case of a facility for producing power from renewable energies. On the basis of this further information, additional tokens can then be generated and issued to the participating persons.

Subsequently, the received energy information or information derived therefrom is stored in a chain of data sets cryptographically linked to one another, i.e. the blockchain, in the smart meter gateway network. This is done by having multiple smart meter gateways generate a data block for the energy information to be stored, and by means of a consensus mechanism to decide which data block of the plurality of generated data blocks is included in the blockchain.

Yield tokens are then calculated. The calculation is based on the received energy information and the smart contract of the facility. The smart contract preferably contains information for calculating the monetary yield of the facility per amount of energy generated, for example in the unit EUR per KWh in the case of an electrical power generation facility. This calculated monetary yield can be converted into a number of yield tokens depending on the value of a yield token.

Finally, part of the yield tokens is allocated to a participating person on the basis of the participation information. The participation information indicates the degree of participation of the person, for example by means of a percentage value. Preferably, the participation information corresponds to the ownership of participation tokens allocated to the respective facility. Depending on this participation information, the share of the yield tokens to which the respective participating person is entitled can be calculated. These yield tokens are subsequently transmitted to a yield wallet of the participating person.

The disclosed method provides the technical advantage that the smart meter gateway network and the use of a chain of data sets cryptographically linked to one another to store the energy information create a highly secure computing environment, on the basis of which secure and highly accurate billing of facility yields is possible within a smart contract that cannot be compromised. In addition, direct participation in facilities by investors is made possible, which involves low fixed costs but still offers high transparency.

With regard to more detailed technical embodiments of the smart meter gateway, reference shall be made to the technical guideline of the German Federal Office for Information Security (BSI) TR-03109-1, version 1.0, which is incorporated by reference herein.

According to an exemplary embodiment, the smart meter gateway network comprises multiple smart meter gateways installed at different locations. Preferably, one smart meter gateway is installed at the facility or in close local relation to the facility, but the other smart meter gateways are provided in locations separate from this facility, e.g. at different power generation or power consuming facilities (e.g., houses, power plants, photovoltaic systems, commercially used buildings, etc.).

According to an exemplary embodiment, the smart meter gateways of the smart meter gateway network are coupled to one another by a cryptographically secured network connection. This ensures secure communication between the smart meter gateways of the smart meter gateway network.

According to an exemplary embodiment, the smart meter gateway network implements a proof-of-stake consensus mechanism for determining whether a proposed data block or which of the proposed data blocks is included in the chain of data sets cryptographically linked to one another. A proof-of-stake consensus mechanism requires less computational resources to achieve consensus than a proof-of-work consensus mechanism. Since the computational power of the smart meter gateways is limited, a proof-of-stake consensus mechanism can be used to achieve consensus in less time. Alternatively, other consensus mechanisms can also be used, e.g. a proof-of-work consensus mechanism or a proof-of-authority consensus mechanism.

According to an exemplary embodiment, the yield tokens are uniquely allocated to the respective facility. In other words, each facility thus has its own yield tokens. It is thus possible to determine by the yield token alone which facility the yield token originates from.

According to an exemplary embodiment, yield tokens are generated for a defined billing period and stored in a facility yield wallet allocated to the facility. The yield tokens are thus initially generated centrally, preferably within the smart meter gateway network. The yield tokens are generated, e.g. every 24 hours depending on the energy information received, i.e. in particular the energy values added up over the billing period, and are temporarily stored in the facility yield wallet. From this facility yield wallet, the yield tokens can then be distributed depending on the participation. Preferably, the yield tokens are automatically distributed by the smart contract depending on the participation tokens held by the respective person.

According to an exemplary embodiment, the yield tokens of the facility yield wallet are distributed to yield wallets of the participating persons on the basis of the participation information. As a result, depending on the participation share, the participating person or investors can receive a share of the yield.

According to an exemplary embodiment, participation tokens are allocated to a participating person according to his/her participation share, which are stored in a participation wallet. The participation tokens are quasi freely tradable participation certificates, with each participation token reflecting a certain facility value. The participation tokens are credited to a participation wallet of the participating person after the acquisition of a participation in the facility. Here, the participation wallet is preferably uniquely allocated to the respective facility and furthermore receives preferably exclusively participation tokens belonging to this facility.

According to an exemplary embodiment, the yield wallet and the participation wallet are formed by different wallets. It is thus possible to distinguish the tokens reflecting the facility participation from the tokens reflecting the accumulated yields of the facility.

Alternatively, the yield tokens and the participation tokens can be supplied to a single wallet, and in particular if the yield tokens and the participation tokens are distinguishable from one another by a unique identifier or ID.

According to an exemplary embodiment, the participation information is a direct component of the smart contract or the smart contract contains information that refers to the participation information. On the basis of the smart contract, it is thus possible to assign the yield tokens to the respective participating persons.

According to an exemplary embodiment, the smart contract comprises facility parameters which characterize the energy production facility and on the basis of which the yield tokens are calculated. In particular, the smart contract comprises an algorithm or a calculation formula, on the basis of which the number of yield tokens to be generated can be determined from the energy information received, in particular the generated energy values added up over a billing period. The smart contract may be also stored in the blockchain held in the smart meter gateway network.

According to an exemplary embodiment, the facility parameters comprise information about the remuneration of the generated energy, technical facility parameters and/or monetary facility parameters. Information about the remuneration may, for example, indicate the remuneration paid by law (for example, by the German Renewable Energy Law) for renewable energies. Technical facility parameters can be, for example, parameters with regard to facility yield (e.g. orientation location etc.), facility runtime, facility degradation parameters, etc. Financial parameters can be, for example, the number of participation tokens issued, the distribution of the participation tokens among the participating persons, fixed costs incurred (for example, for maintenance and repair), etc.

According to a further aspect, the present disclosure relates to a system for the distributed assignment of yields of a facility to a plurality of participating persons, comprising a network with a plurality of smart meter gateways, a smart meter gateway of the smart meter gateway network being coupled to a measuring sensor of the facility, the system being configured to carry out the following operations:

storing participation information which includes information with regard to the participation of a person in a chain of data sets cryptographically linked to one another in the smart meter gateway network;

storing a smart contract in a chain of data sets cryptographically linked to one another in the smart meter gateway network, the smart contract being uniquely allocated to the facility and containing facility parameters necessary to calculate yields of the facility;

receiving energy values produced by the facility by means of at least one smart meter gateway from the measuring sensor of the facility, the smart meter gateway being a component of the smart meter gateway network;

storing the received energy values in a chain of data sets cryptographically linked to one another in the smart meter gateway network;

calculating yield tokens on the basis of the detected energy values and the smart contract of the facility; and assigning a part of the yield tokens to a participating person on the basis of the participation information.

According to an exemplary embodiment of the system, an interface for receiving participation information is provided. This interface can be used to notify the system that the participation structure of the facility has changed, for example, in the form that the participation tokens issued for the first time have been acquired by an investor or that these participation tokens have been transferred from one investor to another investor.

According to an exemplary embodiment, an interface is provided for forwarding yield tokens from a facility yield wallet to yield wallets of the participating persons. Through this interface, the yield tokens can be distributed depending on the current participation structure.

"Energy generation facility" in the sense of the present disclosure is understood to mean any facilities for generating energy, in particular electrical energy. These are, for example, photovoltaic systems, waste-to-energy plants, i.e. plants that thermally recycle waste to generate electrical or thermal energy, etc. "Generated energy" can also include an energy conversion process.

"Persons" in the sense of the present disclosure are understood to include both natural persons and legal entities.

"Smart contract" as used in the present disclosure is understood to mean a computer protocol or software executable by a processor that represents a contract. In this context, a smart contract replicates the logic of contractual provisions by technical means (in particular by means of a suitable executable code).

"Yield tokens" in the sense of the present disclosure are understood to mean tokens that are issued on the basis of the yield, for example the monetary yield of the facility. In other words, the yield tokens reflect the financial entitlement from the energy yield of the facility.

"Participation tokens" as used in the present disclosure are understood to mean tokens issued in exchange for a person's participation in the facility. In other words, participation tokens securitize the person's participation in the facility or investment in the facility.

The expressions "approximately", "substantially" or "about" in the sense of the present disclosure mean deviations from the respectively exact value by +1-10%, preferably by +/−5% and/or deviations in the form of changes that are insignificant for the function.

Further developments, advantages and possible applications of the present disclosure also result from the following description of exemplary embodiments and from the drawings. In this connection, all the features described and/or illustrated are in principle the subject matter of the present disclosure, either individually or in any combination, irrespective of their combination in the claims or their back-reference. Furthermore, the content of the claims is made a part of the description.

BRIEF DESCRIPTION OF THE DRAWINGS

The invention will be explained in more detail below with reference to the drawings by means of exemplary embodiments. In the drawings.

DETAILED DESCRIPTION

Figure 1:
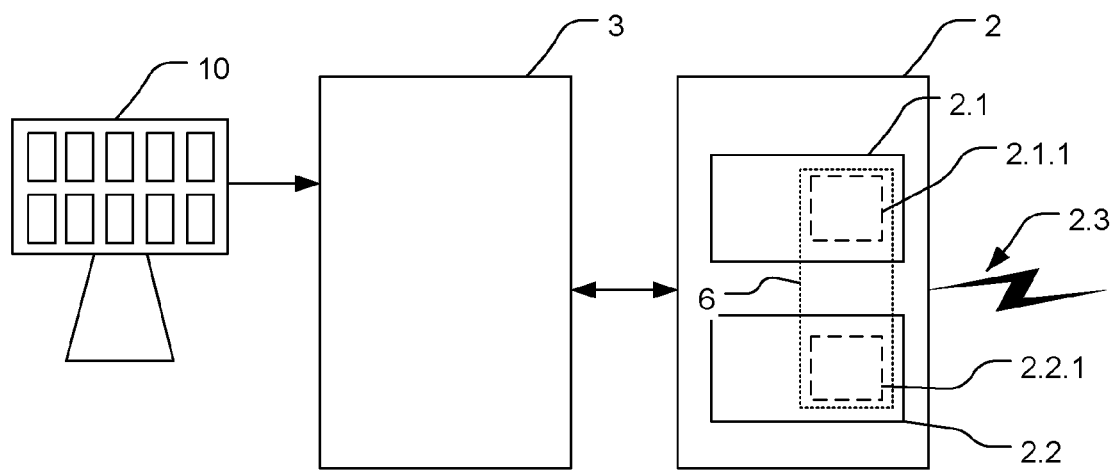
FIG. 1 shows, by way of example, a schematic diagram of an energy generation facility coupled to a measuring sensor and a smart meter gateway.

FIG. 1 shows, by way of example and roughly schematically, a smart meter gateway 2 which is coupled to a measuring sensor 3 and which receives measurement data from the measuring sensor 3, for example an electricity meter, stores them and, if necessary, processes them in order to forward the measurement data or information derived therefrom (for example by further processing the measurement data) to an information recipient. Such information recipients can be, for example, a billing office, a utility company, etc. Thus, the smart meter gateway 2 forms a gateway for the communication of the measuring sensor 3 to the outside.

The smart meter gateway 2 is preferably arranged in the immediate local vicinity of the measuring sensor 3. For example, the smart meter gateway 2 can be provided in a consumption point, in particular a building, in which the measuring sensor 3 is also located. Alternatively, the measuring sensor 3 and the smart meter gateway 2 can be allocated to an energy generation facility in order to determine the energy generated by the facility and to communicate information about this generated energy to the outside.

The smart meter gateway 2 comprises at least one processor 2.1 for carrying out computing operations and a memory unit 2.2 for storing data.

For the distributed assignment of yields of a facility 10 to a plurality of participating persons 5 and the calculation and storage of data sets required for this purpose, an encapsulated area 6 is provided, which is shown by a dotted rectangle in FIG. 1. This encapsulated area 6 forms a so-called "sandbox", i.e. an isolated area, so that the calculation and storage processes in this encapsulated area 6 have no effect on the other processes (for example, acquisition and evaluation of measurement data) that are processed outside the encapsulated area 6 by the smart meter gateway 2.

In particular, a processor area 2.1.1 of the processor 2.1 and a storage area 2.2.1 of the memory unit 2.2 can be assigned to the encapsulated area 6, so that the encapsulated area 6 basically accesses the same hardware that is also used for the other processes processed in the smart meter gateway 2 (for example, acquisition and evaluation of measurement data). However, virtual separation is achieved by assigning to the encapsulated area 6, for example, a different processor area 2.1.1 (for example, a processor core of a multi-core processor) and a different storage area 2.2.1 (different memory addresses) than the other processes processed in the smart meter gateway 2. In other words, virtual encapsulation is accordingly achieved for the transaction execution processes.

Alternatively, the encapsulated area 6 can have its own processor and its own memory unit to which the other processes processed in the smart meter gateway 2 (for example, acquisition and evaluation of measurement data) do not have access, so that a physical separation is achieved instead of a virtual separation.

For example, the encapsulated area 6 can be designed as a plug-in module and can be coupled to the smart meter gateway 2 by plugging it in to exchange information. The exchange of information via the interface is preferably encrypted. Information is also preferably exchanged via a HAN/CLS interface (HAN: Home Area Network; CLS: Controllable Local System). Preferably, the plug-in can also ensure the energetic supply of the module. Preferably, the plug-in module is also authenticated with respect to the smart meter gateway 2. Furthermore, the plug-in preferably also mechanically fixes the module to the smart meter gateway 2. The interface for supplying the module with information and energy can be formed in particular by an elongated contact strip.

The encapsulated module can provide a TCP/IP-based interface via which third-party devices can be coupled to the smart meter gateway 2. In particular, this TCP/IP-based interface can be used to combine multiple smart meter gateways 2 located at different locations into a smart meter gateway network N to carry out transactions.

The encapsulated area 6 can also receive measurement data or information derived from measurement data, depending on the configuration of the smart meter gateway 2. This can be done, for example, via an internal data exchange in the smart meter gateway 2 between the encapsulated area 6 and an area virtually or physically separated from the encapsulated area 6. Direct access to storage areas in which the measurement data or information derived from measurement data is stored is preferably not possible from the encapsulated area 6.

Furthermore, the smart meter gateway 2 has a communication interface 2.3 via which data can be sent and received by the smart meter gateway 2.

The smart meter gateway 2 is configured to calculate one or more data sets containing information, on the basis of which the distributed yield assignment is carried out. The information can, for example, relate to energy values generated by the facility 10, to participation information, to yield tokens, etc. A data set is in particular a data block that shall be included in a chain of data sets in such a way that the data sets are cryptographically chained together to ensure the authenticity of the chain of data sets.

For example, a data set can include cryptographically encrypted information of a preceding, in particular immediately preceding, data set in the chain of data sets (for example, a hash value of the entire data set or a part thereof), the transaction data, and preferably a time stamp indicating at what time the data set was generated.

In order to generate the time stamp, the smart meter gateway 2 can have access to a clock. This clock can be in particular an atomic clock, so that the smart meter gateway 2 can generate a time stamp on the basis of the International Atomic Time (TAI), for example. This allows highly accurate time tagging of data sets.

Figure 2:
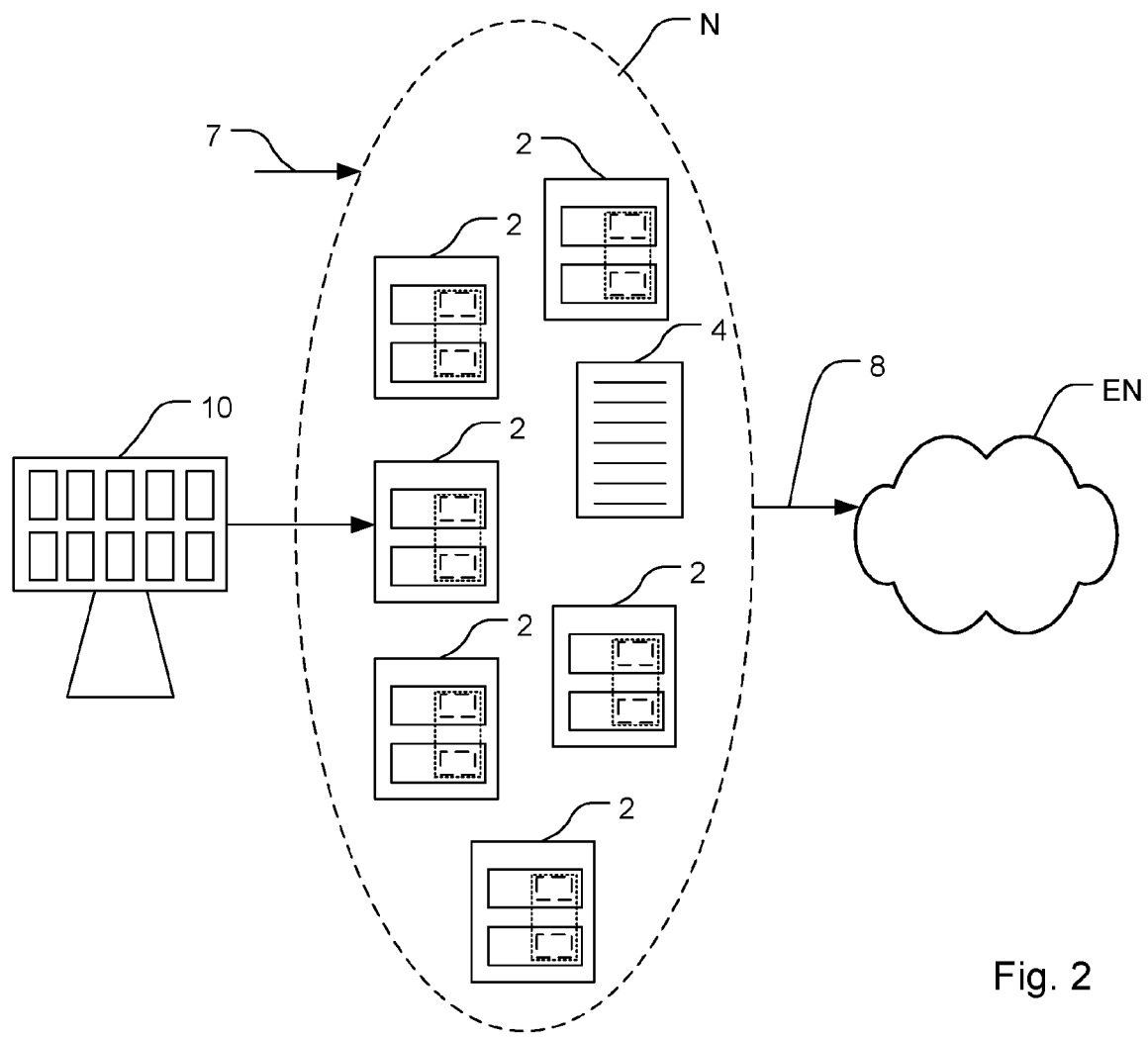
FIG. 2 shows, by way of example, a schematic diagram of an energy generation facility connected via a smart meter gateway network to a network hosting the yields of the investors.

FIG. 2 illustrates the integration of the smart meter gateway 2, which is coupled to the energy generation facility 10, into a smart meter gateway network N. The smart meter gateway network N comprises a plurality of smart meter gateways 2 installed at different locations, wherein one of the smart meter gateways 2 is coupled to the energy generation facility 10 for recording the generated energy thereof. The other smart meter gateways 2 are coupled to other measuring sensors 3, for example to electricity meters in houses, enterprises, or also other energy generation facilities. The smart meter gateways 2 of the smart meter gateway network N are coupled to one another via a secure network connection so that they can exchange data with one another. The smart meter gateway network N is here designed in particular as a so-called blockchain network, i.e. the smart meter gateways 2 of the smart meter gateway network N each store a chain of data sets cryptographically linked to one another (so-called blockchain). Moreover, as described above, the smart meter gateways 2 are configured to calculate data sets to be included in the blockchain. Data sets to be included in the blockchain are preferably calculated in parallel by a plurality of smart meter gateways 2 and a consensus mechanism is used to decide which data set of the plurality of generated data sets is included in the blockchain. For this purpose, the smart meter gateway network N preferably uses a proof-of-stake consensus mechanism to achieve a consensus that saves computational resources compared to a proof-of-work consensus.

The smart meter gateway network N further stores a so-called smart contract 4. A smart contract 4 is a digital contract which is stored in the blockchain and in which parameters necessary to calculate yields of the facility 10 are stored. Furthermore, the smart contract 4 can be used to specify the occurrence of which conditions triggers certain processes, e.g. when the energy values generated by the facility 10 are determined and stored in the blockchain or when and on the basis of which parameters the yields of the facility are determined.

The smart contract 4 can further store participation information, or the smart contract 4 can contain information that refers to participation information (e.g. a pointer to a storage area where the participation information is stored).

The smart meter gateway network N comprises an interface 7 via which the smart meter gateway network N can receive participation information. In addition, an interface 8 is provided via which information regarding the yields or yield tokens to be distributed to the participating persons 5 is transmitted from the smart meter gateway network N to a network EN in which yield wallets of the participating persons 5 or investors are hosted. The yields or yield tokens can then be transmitted via the interface 8 and credited to the accounts or yield wallets 5.1 of the participating persons 5.

Figure 3:
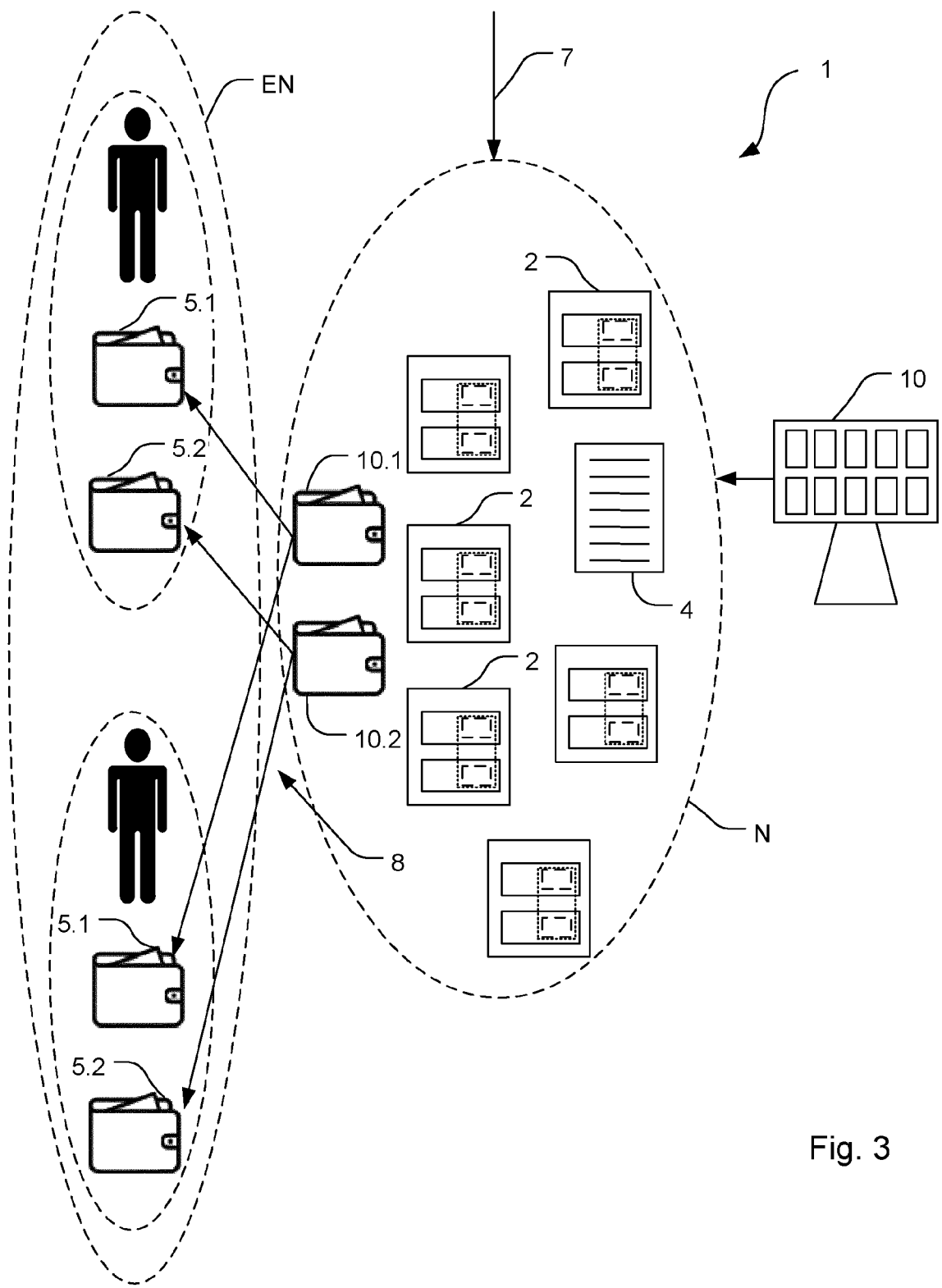
FIG. 3 shows, by way of example, a block diagram of a system for the distributed assignment of yields from a facility to a plurality of participating persons.

FIG. 3 shows the system 1 for the distributed assignment of yields from a facility 10 to a plurality of participating persons 5 in more detail. The blockchain stored by the smart meter gateway network N preferably stores participation information indicating which persons participate in the facility 10 to which this smart meter gateway network N is allocated. In this regard, the smart meter gateway network N hosts, for example, a facility participation wallet 10.2 into which participation tokens are stored at a certain point in time, for example, when the facility 10 is put into operation or when the participation model in the facility 10 is started. The sum of all participation tokens corresponds to the total participation value of the facility 10. If, for example, a participation in a facility 10 with a value of EUR 1 million is issued and ten thousand participation tokens of EUR 100 each are issued for this purpose, ten thousand participation tokens are initially transferred to the facility participation wallet 10.2, preferably via the interface 7.

Participation tokens can then be transferred from the facility participation wallet 10.2 to the participation wallets 5.2 of the persons 5, depending on the degree of participation of the respective person 5. For example, if a person 5 participates in the facility 10 with an amount of one thousand euros, ten participation tokens of EUR 100 each are transferred to his/her participation wallet 5.2. The participation tokens are transferred from the facility participation wallet 10.2 to the participation wallets 5.2 via interface 8.

For the secure storage of the participation information, the participation wallets 5.2 and/or the facility participation wallet 10.2 themselves or the distribution of the participation tokens to the participation wallets 5.2 or the facility participation wallets 10.2 are stored in the blockchain.

On the basis of the yields generated by the facility 10, yield tokens are generated and stored in the facility yield wallet 10.1. This is preferably done in the smart meter gateway network N on the basis of information stored in the smart contract 4. The smart contract 4 preferably comprises at least one calculation rule comprising facility parameters characterizing the respective facility 10. The facility parameters are, in particular, economic framework parameters on the basis of which the yield of the facility 10 to be distributed to the participating persons is determined.

Preferably, the smart meter gateway network N, the facility participation wallet 10.2 and the facility yield wallet 10.1 are uniquely allocated to a single facility 10. The same is preferably true for the smart contract 4 that is hosted in the smart meter gateway network N.

As described above, the energy values generated by the facility 10 are logged in time succession at certain points in time, in particular at a defined time interval, for example every 15 minutes, and stored in the blockchain in the smart meter gateway network N. After a certain period of time, for example after 24 hours, a calculation of the generated yields is completed on the basis of the smart contract 4. On the basis of these calculated yields, yield tokens are then generated and stored in the facility yield wallet 10.1.

The yield tokens are subsequently transferred from the facility yield wallet 10.1 to the yield wallets 5.1 of the participating persons 5 on the basis of the participation information. For example, if a person 5 has a participation level of 1% in the facility, an assignment of 1% of the yield tokens is carried out from the facility yield wallet 10.1 to the yield wallet 5.1 of this participating person 5.

The participation tokens are transferred from the facility yield wallet 10.1 to the yield wallets 5.1 via the interface 8.

Figure 4:
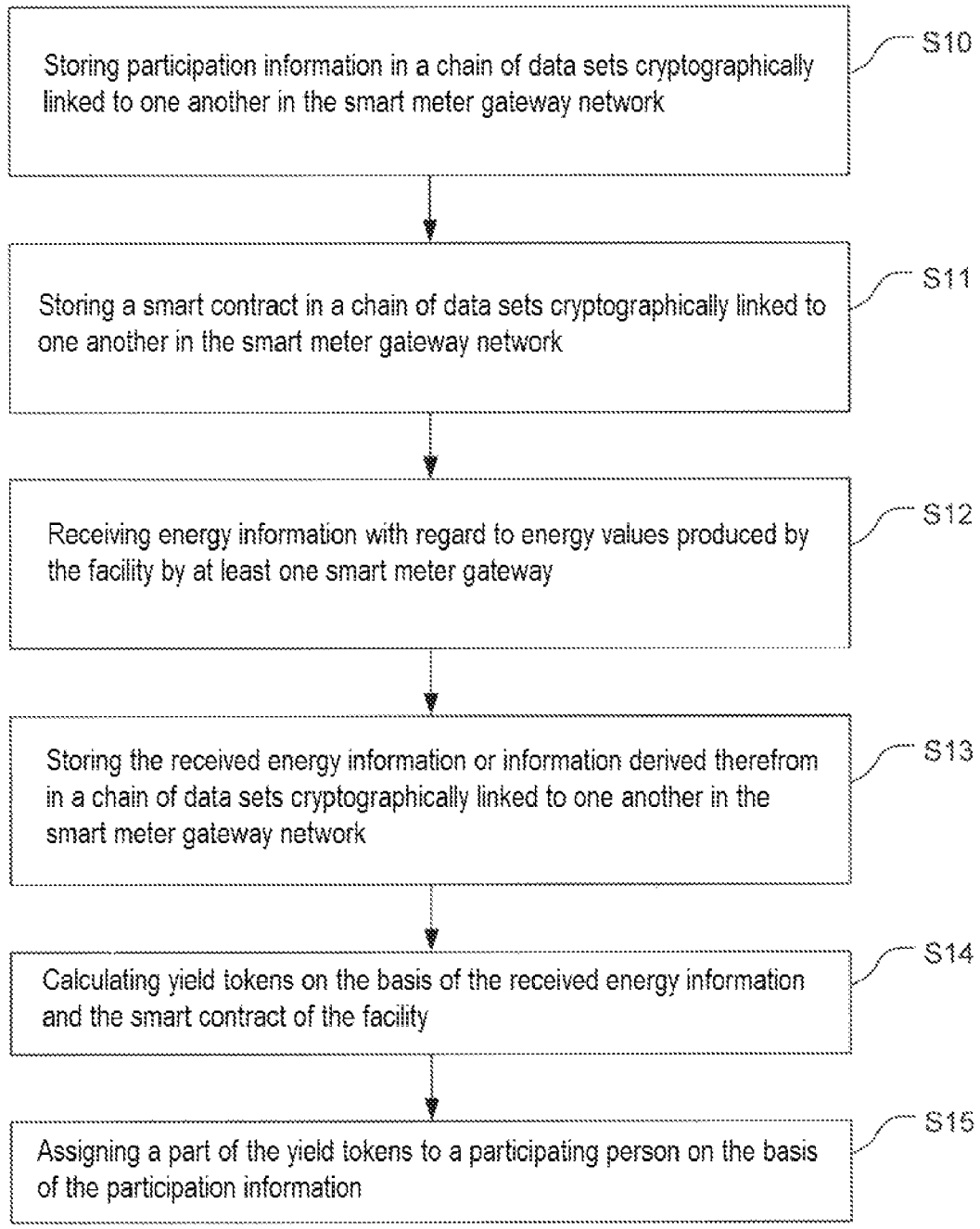
FIG. 4 shows, by way of example, a flowchart illustrating the steps of a method for the distributed assignment of yields of a facility to a plurality of participating persons.

FIG. 4 schematically shows the method steps of a method for the distributed assignment of yields of a facility 10 to a plurality of participating persons 5 on the basis of a network N comprising a plurality of smart meter gateways 4.

First, participation information containing information with regard to the participation of a person 5 in the facility 10 is stored in a chain of data sets cryptographically linked to one another, i.e. a blockchain, in the smart meter gateway network N (S10).

In addition, a smart contract is stored or hosted in the chain of data sets cryptographically linked to one another, i.e. the blockchain, in the smart meter gateway network N. The smart contract 4 is uniquely allocated to the facility 10 and contains facility parameters necessary to calculate yields of the facility 10 (S11).

Subsequently, energy information with regard to energy values produced by the facility 10 is received by at least one smart meter gateway 2, the smart meter gateway 2 being a component of the smart meter gateway network N (S12).

This received energy information or information derived therefrom is stored in a chain of data sets cryptographically linked to one another, i.e. the blockchain, in the smart meter gateway network N (S13).

On the basis of the received energy information and the smart contract 4 of the facility 10, yield tokens are then calculated (S14).

On the basis of the participation information, a part of the yield tokens is finally assigned to a participating person 5 (S15).

The invention has been described above by means of exemplary embodiments. It is understood that numerous changes as well as modifications are possible, without thereby leaving the inventive idea underlying the invention.

LIST OF REFERENCE SIGNS

1 system
2 smart meter gateway
2.1 processor
2.1.1 processor area
2.2 memory unit
2.2.1 storage area
2.3 communication interface
3 measuring sensor
4 smart contract
5 person
5.1 yield wallet
5.2 participation wallet
6 encapsulated area
7 interface
8 interface
10 facility
10.1 facility yield wallet
10.2 facility participation wallet
N smart meter gateway network
EN network

The invention claimed is:

1. A method for the distributed assignment of yields of a facility to a plurality of participating persons on the basis of a smart meter gateway network comprising a plurality of smart meter gateways, the method comprising the following steps:
   storing participation information including information with regard to the participation of a person in the facility, in a chain of data sets cryptographically linked to one another in the smart meter gateway network;
   storing a smart contract in a chain of data sets cryptographically linked to one another in the smart meter gateway network, the smart contract being uniquely allocated to the facility and containing facility parameters necessary to calculate yields of the facility;
   receiving energy information with regard to energy values produced by the facility by at least one smart meter gateway, the smart meter gateway being a component of the smart meter gateway network;
   storing the received energy information or information derived therefrom in a chain of data sets cryptographically linked to one another in the smart meter gateway network;
   calculating yield tokens on the basis of the received energy information and the smart contract of the facility; and
   assigning a part of the yield tokens to a participating person on the basis of the participation information.

2. The method according to claim 1, wherein the smart meter gateway network comprises a plurality of smart meter gateways installed at different locations.

3. The method according to claim 1, wherein the smart meter gateways of the smart meter gateway network are coupled to one another by a cryptographically secured network connection.

4. The method according to claim 1, wherein the smart meter gateway network implements a proof-of-stake consensus mechanism for determining whether a proposed data block or which of the proposed data blocks is included in the chain of data sets cryptographically connected to one another.

5. The method according to claim 1, wherein the yield tokens are uniquely assigned to the respective facility.

6. The method according to claim 1, wherein yield tokens are generated for a defined billing period and stored in a facility yield wallet allocated to the facility.

7. The method according to claim 6, wherein the yield tokens of the facility yield wallet are distributed to yield wallets of the participating persons on the basis of the participation information.

8. The method according to claim 1, wherein participation tokens are allocated to a participating person according to his/her participation share and are stored in a participation wallet.

9. The method according to claim 8, wherein the yield wallet and the participation wallet are formed by different wallets.

10. The method according to claim 1, wherein the participation information is a direct component of the smart contract or the smart contract contains information that refers to the participation information.

11. The method according to claim 1, wherein the smart contract contains facility parameters that characterize the energy production facility and on the basis of which the yield tokens are calculated.

12. The method according to claim 11, wherein the facility parameters comprise information about the remuneration of the generated energy, technical facility parameters and/or monetary facility parameters.

13. A system for the distributed assignment of yields of a facility to a plurality of participating persons, comprising a smart meter gateway network with a plurality of smart meter gateways, a smart meter gateway of the smart meter gateway network being coupled to a measuring sensor of the facility, wherein the system is designed to carry out the following operations:

storing participation information comprising information with regard to the participation of a person in a chain of data sets cryptographically linked to one another in the smart meter gateway network;

storing a smart contract in a chain of data sets cryptographically linked to one another in the smart meter gateway network, the smart contract being uniquely allocated to the facility and containing facility parameters necessary to calculate yields of the facility;

receiving energy values produced by the facility by at least one smart meter gateway from the measuring sensor of the facility, the smart meter gateway being a component of the smart meter gateway network;

storing the received energy values in a chain of data sets cryptographically linked to one another in the smart meter gateway network;

calculating yield tokens on the basis of the detected energy values and the smart contract of the facility; and assigning a part of the yield tokens to a participating person on the basis of the participation information.

14. The system according to claim 13, wherein an interface for receiving participation information is provided.

15. The system according to claim 13, wherein an interface is provided for transferring yield tokens from a facility wallet to yield wallets of participating persons.

* * * * *